United States Patent

[11] 3,558,844

| [72] | Inventor | Walter Lobur |
| | | Clawson, Mich. |
| [21] | Appl. No. | 723,760 |
| [22] | Filed | Apr. 24, 1968 |
| [45] | Patented | Jan. 26, 1971 |
| [73] | Assignee | Elox Inc. |
| | | Troy, Mich. |
| | | a corporation of Delaware |

[54] ELECTRICAL DISCHARGE MACHINING SERVO CONTROL CIRCUIT
4 Claims, 1 Drawing Fig.

| [52] | U.S. Cl. | 219/69 |
| [51] | Int. Cl. | B23p 1/14 |
| [50] | Field of Search | 219/69F, 69C, 69G, 69P |

[56] References Cited
UNITED STATES PATENTS
3,167,631  1/1965  Schulz et al..................  219/69(G)

*Primary Examiner*—R. F. Staubly
*Attorney*—Harry R. Dumont

ABSTRACT: A circuit for providing function control for electrical discharge machining apparatus wherein a servofeed control means or the like has its operation related to gap condition during machining pulse on-time only. A gap voltage signal-sensing network and a reference voltage network are employed with the servofeed means operable responsive to their difference. An additional means is incorporated in the circuit for holding the signal sensed at a relatively constant level between machining power pulses.

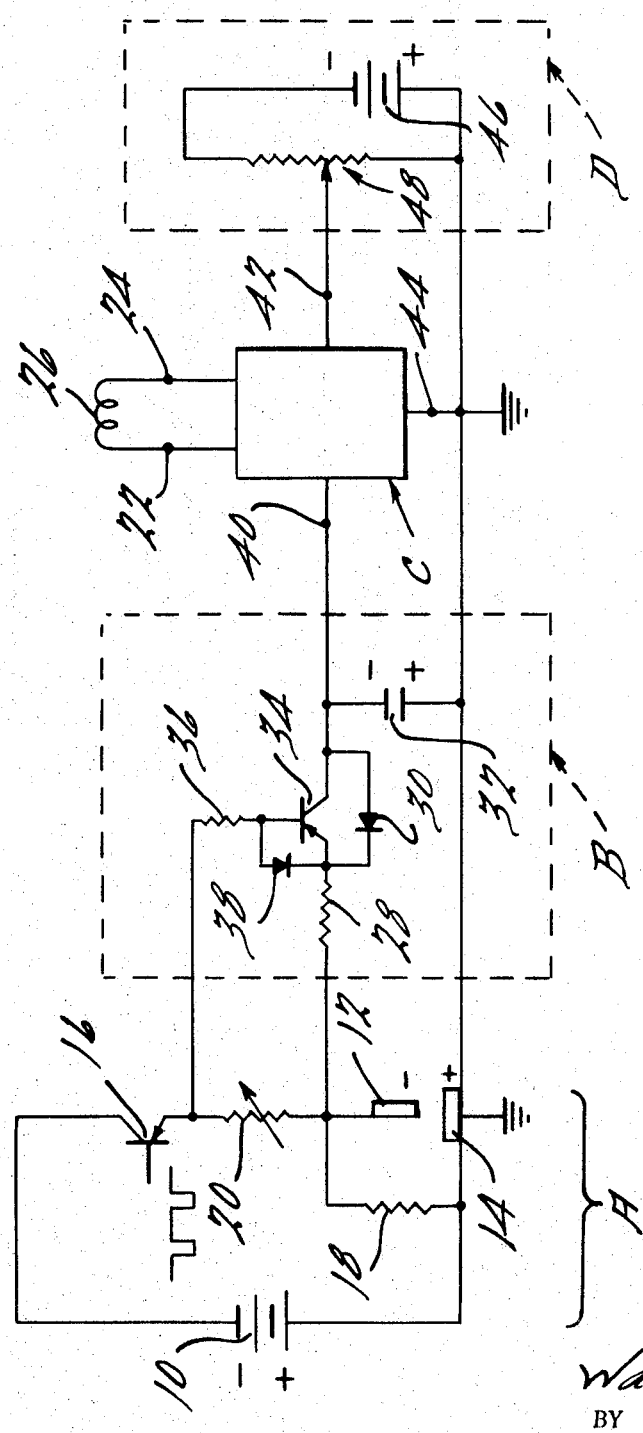

ic Discharge Machin-
ELECTRICAL DISCHARGE MACHINING SERVO CONTROL CIRCUIT

BACKGROUND OF THE INVENTION

In prior art gap-sensing networks such as peak storage networks and averaging networks there is included a circuit completion decay resistor and a storage device such as a capacitor. During low duty factor, i.e. very narrow "on" time as compared to "off" time, the ratio of the stored charge to decay time requires frequent readjustment of gap reference controls or the use of such a large storage capacitors that safe operation is endangered by the slow response time. Known function control circuits used in EDM suffer from the limits of this power, decay time factor over the wide range of on-off times and frequencies required for operation. The present invention provides a sensing and control system which is relatively immune to changes in duty factor and pulse width since it makes possible holding the gap signal level between pulses with minimum decay and with independence from gap "off" time effects. The response time of my improved system is fast because the discharge of stored voltage from the last prior pulse is literally "dumped" through a low impedance transistor instead of through a discharge resistor.

SUMMARY OF THE INVENTION

My invention provides a function control circuit for electrical discharge machining which is particularly adapted for servo feed control. In my circuit, connection to the gap is virtually eliminated between actual machining power pulses. Accordingly, the final condition of the last prior machining pulse is held until the next machining power pulse resets a new level.

BRIEF DESCRIPTION OF THE DRAWING

The drawing is a combined schematic and diagrammatic showing of my invention as incorporated in an electrical discharge machining power supply for servofeed control of the tool electrode.

DESCRIPTION

In the interest of brevity, the power supply circuit has been simplified as shown. In current commercial EDM power supplies, an electronic switch or bank of switches is connected between a main machining power supply 10 and the gap which includes a tool electrode 12 and a workpiece 14. A flow of coolant is maintained in the gap to wash away eroded particles as machining progresses. In the present instance, a transistor 16 or bank of parallel connected transistors, depending on the power output desired, is used as the electronic switch to provide machining power pulses across the gap. Transistor 16 has its principal electrodes, collector and emitter, coupled as shown between the negative terminal of power supply 10 and the gap so that the polarity of electrode 12 is negative relative to workpiece 14. The base or control electrode of transistor 16 is triggered by suitable pulses from an appropriate circuit to give a variable duty factor, rectangular pulsed waveform. Reference is made to my U.S. Pat. No. 3,243,567, issued on Mar. 29, 1966, for its showing of a number of suitable EDM pulsing circuits.

The gap may also be shunted by a load resistance such as resistor 18. A variable magnitude series resistor 20 is included in the circuit to limit machining current at the desired level. The power supply is generally denoted by the reference letter A. The circuit further includes a gap sensing and processing network B, a utilization means C, and a reference network D. The present embodiment being that of a servocontrol system, the utilization means C comprises an electrically operated servofeed with output terminals 22, 24 and a hydraulic servocontrol coil 26 connected thereacross. One example of an electrohydraulic servofeed system suitable for use with my circuit is disclosed in detail in Webb U.S. Pat. No. 3,318,793, issued on May 9, 1967, entitled "Servofeed Means for Electrical Discharge Machining" which patent is of common ownership herewith.

My control circuit is equally compatible with servo control systems of the electrical motor type in which a motor control winding would be connected across terminals 22, 24 as is known in the art. It is also applicable to other utilization means for the power supply such as a short circuit power interruption system as is shown in my U.S. Pat. No. 3,515,838 issued on June 2, 1970, entitled "Electrical Discharge Machining Pulse Current Control Apparatus and Method."

Sensing network B includes resistor 28 acting as a surge limiting resistor for the gap power flowing through diode 30 to charge capacitor 32 to a polarity as shown. Transistor 34 has its emitter-collector connected across diode 30 with an opposite current conducting polarity thereto as shown. Transistor 34 further has its base connected through limiting resistor 36 to the output of transistor 16 to receive a keyed gating signal. Diode 38 protects the base-emitter junction of transistor 34 from excess inverse voltage.

Terminal 40 represents the processed signal input to the control unit C for the utilization means. Terminal 42 receives the reference signal with which the processed gap signal is compared. Amplification is usually made to control output for the utilization means at terminals 22, 24. The output may be of reversible polarity as has already been indicated to feed a servomotor or hydraulic coil 26. Alternately, the output may be single terminal with reference to ground 44 to actuate a power cutoff or like protection system for an electrical discharge machining apparatus. The reference network D is shown with a voltage source 46 and adjustable potentiometer 48. The reference network is shown separately since its output, similarly to that of the gap sensing network, can be processed in accordance with the teachings of my invention.

It is possible to use a second transistor in place of diode 30 with a like phasing to diode 30, i.e. phased oppositely to transistor 34. An arrangement such as this would provide a "-keyed, bilateral conduction." Connection, similarly to that of the circuit shown, would be made to the gap only during signal ontime. The effect of gap condensers, if employed, would by eliminated. In the absence of gap capacitors, well defined and rectangular machining pulses result and diode 30 can be used in place of a second transistor.

Diode 30 charges capacitor 32 to the gap ontime voltage. At the same time during gap ontime, transistor 34 is closed to discharge capacitor 32 in the event its stored voltage is higher than gap voltage. If the control means C is of sufficiently high impedance to place a low current drain on the charge on capacitor 32, the voltage level at terminal 40 will remain relatively constant until the next pulse "resets" it to a new value.

It will thus be seen that by my improved circuit it is possible to provide function control for electrical discharge machining or like electrical machining wherein spaced machining power pulses are used for material removal such as, for example, certain forms of electrochemical machining. The response time of my circuit is relatively fast, and its operation is extremely uniform over a wide range of machining parameters.

I claim:

1. A servo feed control circuit for use in conjunction with an electrical discharge machining apparatus wherein workpiece material is removed by periodic power pulses passed between a tool electrode and a workpiece across a dielectric coolant filled gap including an electronic output switch connected between a power supply and said gap for providing machining power pulses to said gap at preset on off times and frequencies, a sensing network connected to said gap for providing a gap voltage signal representative of gap condition, a reference voltage signal network, an electrically operated servofeed means connected between said networks for controlling relative movement between said electrode and said workpiece responsive to the difference between said signals, wherein the improvement comprises a diode coupled between said gap and said sensing network, a decoupling means connected between said gap and said sensing network, said decoupling means comprising an electronic switch having its principal electrodes connected across said diode in opposite polarity thereto, and a keying means coupled between said output switch and said decoupling means for rendering it operable during machining pulse offstime, said keying means comprising a network connected between the output of said output switch and the control electrode of said last mentioned electronic switch.

2. A servofeed control circuit for use in conjunction with an electrical discharge-machining apparatus wherein workpiece material is removed by periodic power pulses passed between a tool electrode and a workpiece across a dielectric coolant filled gap including an electronic output switch connected between a power supply and said gap for providing machining power pulses to said gap at preset on-off times and frequencies, a sensing network operatively connected to said gap for providing a voltage signal representative of gap condition, a reference voltage signal network, an electrically operated servofeed means connected between said networks for controlling relative movement between said electrode and said workpiece responsive to the difference between said signals, wherein the improvement comprises a unidirectional current conducting device coupled between said gap and said sensing network, a decoupling electronic switch having its principal electrodes connected across said unidirectional current conducting device in opposite polarity thereto, and a keying network connected between the output of said output switch and the control electrode of said decoupling switch for rendering it operable during machining pulse off-time.

3. The combination as set forth in claim 2 wherein a resistor is connected in series between one terminal of said gap and one terminal of said unidirectional current conducting device and wherein a capacitor is connected between the other terminal of said device and the second terminal of said gap.

4. The combination as set forth in claim 2 wherein said keying network has its terminal connected to the principal electrode of said output switch proximate said gap.